(12) United States Patent
Wilson (10) Patent No.: US 10,452,046 B2
(45) Date of Patent: Oct. 22, 2019

(54) COOKING APPLIANCE CONTROL OF RESIDENTIAL HEATING, VENTILATION AND/OR AIR CONDITIONING (HVAC) SYSTEM

(71) Applicant: Midea Group Co., Ltd., Foshan (CN)

(72) Inventor: Mark W. Wilson, Louisville, KY (US)

(73) Assignee: MIDEA GROUP CO., LTD., Beijiao, Shunde, Foshan, Guangdong (CN)

( * ) Notice: Subject to any disclaimer, the term of this patent is extended or adjusted under 35 U.S.C. 154(b) by 33 days.

(21) Appl. No.: 15/637,916

(22) Filed: Jun. 29, 2017

(65) Prior Publication Data

US 2019/0004491 A1   Jan. 3, 2019

(51) Int. Cl.

| | |
|---|---|
| G05B 19/042 | (2006.01) |
| A47L 15/00 | (2006.01) |
| F24C 7/08 | (2006.01) |
| G01F 23/28 | (2006.01) |
| G06F 3/01 | (2006.01) |
| G06F 3/042 | (2006.01) |
| H05B 6/64 | (2006.01) |
| B60Q 1/00 | (2006.01) |

(52) U.S. Cl.
CPC ...... G05B 19/0423 (2013.01); A47L 15/0063 (2013.01); F24C 7/082 (2013.01); G01F 23/28 (2013.01); G06F 3/01 (2013.01); G06F 3/042 (2013.01); H05B 6/6435 (2013.01); B60Q 1/00 (2013.01); G05B 2219/23031 (2013.01); G05B 2219/2643 (2013.01); G05B 2219/31048 (2013.01); H05B 2213/04 (2013.01)

(58) Field of Classification Search
CPC ...... G05B 19/0423; G05B 2219/23031; G05B 2219/2643; G05B 2219/31048; G06F 3/042; G06F 3/01; A47L 15/0063; F24C 7/082; G01F 23/28; B60Q 1/00; H05B 2213/04; H05B 6/6435

USPC ........................................................ 700/276
See application file for complete search history.

(56) References Cited

U.S. PATENT DOCUMENTS

| | | |
|---|---|---|
| 5,139,009 A | 8/1992 | Walsh |
| 6,920,874 B1 | 7/2005 | Siegel |
| 7,162,517 B2 | 1/2007 | Hallenbeck |
| 7,733,224 B2 | 6/2010 | Tran |
| 7,836,877 B2 | 11/2010 | Gages et al. |

(Continued)

FOREIGN PATENT DOCUMENTS

| | | |
|---|---|---|
| CN | 101209162 A | 7/2008 |
| CN | 102132223 A | 7/2011 |
| WO | WO2015168243 | 11/2015 |

OTHER PUBLICATIONS

Walker, Iain "Houses are Dumb without Smart Ventilation." Berkeley Lab, Mar. 1, 2014.

(Continued)

*Primary Examiner* — Ziaul Karim
(74) *Attorney, Agent, or Firm* — Middleton Reutlinger (57) ABSTRACT

A cooking appliance includes a housing, and a cooking element disposed in the housing and configured to generate energy for cooking food, and a controller coupled to the cooking element and configured to communicate a control signal to selectively actuate a residential heating, ventilation and/or air conditioning (HVAC) system and/or non-cooking device in connection with cooking food with the cooking element.

29 Claims, 4 Drawing Sheets (56) References Cited

U.S. PATENT DOCUMENTS

| | | | |
|---|---|---|---|
| 7,866,312 B2 | 1/2011 | Erdmann | |
| 8,795,040 B2 | 8/2014 | Burdett et al. | |
| 8,988,232 B1 | 3/2015 | Sloo et al. | |
| 9,111,221 B1 | 8/2015 | Kelly et al. | |
| 2007/0125364 A1 | 6/2007 | Cmkovich | |
| 2010/0025483 A1* | 2/2010 | Hoeynck | H02J 3/14 |
| | | | 236/1 C |
| 2010/0101254 A1* | 4/2010 | Besore | G06Q 50/06 |
| | | | 62/264 |
| 2010/0182136 A1* | 7/2010 | Pryor | G01F 23/292 |
| | | | 340/425.5 |
| 2011/0290781 A1* | 12/2011 | Burt | F24C 3/128 |
| | | | 219/396 |
| 2013/0052946 A1 | 2/2013 | Chatterjee et al. | |
| 2014/0130574 A1 | 5/2014 | Happ et al. | |
| 2014/0365018 A1 | 12/2014 | Kusukame et al. | |
| 2015/0136379 A1* | 5/2015 | Takeda | F24D 19/1084 |
| | | | 165/237 |
| 2015/0163535 A1* | 6/2015 | McCarthy, III | G07C 9/00571 |
| | | | 725/49 |
| 2015/0350031 A1 | 12/2015 | Burks et al. | |
| 2016/0195856 A1* | 7/2016 | Spero | G06N 5/046 |
| | | | 700/90 |

OTHER PUBLICATIONS

International Search Report and Written Opinion issued in Application No. PCT/CN2018/078688 dated May 30, 2018.

* cited by examiner

COOKING APPLIANCE CONTROL OF RESIDENTIAL HEATING, VENTILATION AND/OR AIR CONDITIONING (HVAC) SYSTEM

BACKGROUND

Various cooking appliances used in the home, e.g., ranges, cooktops, ovens, etc., can affect the environment within a home during their operation. Cooking appliances often generate heat during cooking, and can thus raise the temperature in the kitchen and/or elsewhere in a home. Cooking appliances can also generate steam, moisture and/or odors as byproducts of the cooking process.

Many homes, for example, are equipped with hoods or vents that are positioned over or adjacent to a cooking appliance to draw in air in the immediate vicinity of the cooking appliance in an attempt to address these cooking byproducts. Some hoods or vents are vented to the exterior of the home, while others merely recirculate the air in the immediate vicinity of the cooking appliance. However, these hoods or vents generally have only a limited effect in the immediate proximity of the cooking appliance, and moreover, they are generally operated manually by a user via separate controls from the cooking appliance.

SUMMARY

The herein-described embodiments address these and other problems associated with the art by providing in one aspect a cooking appliance and method of controlling a residential heating, ventilation and/or air conditioning (HVAC) system in which control over the residential HVAC system is initiated in connection with cooking food with a cooking element of the cooking appliance. As but one non-limiting example, a cooking appliance consistent with some embodiments of the invention may be used to activate a whole house, central, zoned, or room HVAC system in connection with cooking food to better maintain a desired temperature in a kitchen within which the cooking appliance is located and thereby proactively accommodate heat generated during the cooking process.

Therefore, consistent with one aspect of the invention, a cooking appliance may include a housing, a cooking element disposed in the housing and configured to generate energy for cooking food, and a controller coupled to the cooking element and configured to communicate a control signal to selectively actuate a residential heating, ventilation and/or air conditioning (HVAC) system in connection with cooking food with the cooking element.

In some embodiments, the cooking appliance includes an oven, and the cooking element includes a gas, electric, light, or microwave heating element. Also, in some embodiments, the cooking appliance includes a stovetop, and the cooking element includes a gas, electric, or inductive heating element. Further, in some embodiments, the cooking appliance includes a range, and the cooking element includes a gas, electric, light, or inductive heating element.

Further, in some embodiments, the controller is configured to communicate the control signal to selectively actuate the residential HVAC system at a predetermined time relative to actuation of the cooking element. In some embodiments, the controller is configured to communicate the control signal to activate the residential HVAC system at a predetermined time after activation of the cooking element. In addition, in some embodiments, the controller is configured to communicate the control signal to activate the residential HVAC system at a predetermined time prior to activation of the cooking element. Also, in some embodiments, the controller is configured to communicate the control signal to activate the residential HVAC system at a predetermined time relative to a start of a delay start cooking operation.

Some embodiments may also include a sensor coupled to the controller, where the controller is configured to communicate the control signal to selectively actuate the residential HVAC system at least in part in response to the sensor. In some embodiments, the sensor includes a temperature sensor, a humidity sensor, an air quality sensor, an odor sensor or an electronic nose sensor.

In some embodiments, the controller is configured to detect an actuation state of the cooking element and communicate the control signal to selectively actuate the residential HVAC system at least in part in response to the detected actuation state of the cooking element. In addition, some embodiments may also include a network interface coupled to the controller and configured to interface the controller with a home automation network to which the residential HVAC system is also interfaced, where the controller communicates the control signal to communicate the control signal to selectively actuate the residential HVAC system over the home automation network. Moreover, in some embodiments, the network interface includes a wireless network interface, and the residential HVAC system includes a central or room HVAC system. In some embodiments, the residential HVAC system includes a zoned HVAC system, and the controller is configured to communicate a control signal to selectively actuate a first zone among a plurality of zones of the zoned HVAC system.

Consistent with another aspect of the invention, a method may be provided for controlling a residential heating, ventilation and/or air conditioning (HVAC) system using a cooking appliance of the type including a housing, a cooking element disposed in the housing and configured to generate energy for cooking food, and a controller coupled to the cooking element. The method may include activating the cooking element to generate energy for cooking food, and with the controller, communicating a control signal to selectively actuate a residential HVAC system in connection with cooking food with the cooking element.

In some embodiments, the cooking appliance includes an oven, a stovetop or a range, and the cooking element includes a gas, electric, light, microwave or inductive heating element. Moreover, in some embodiments, communicating the control signal includes selectively actuating the residential HVAC system at a predetermined time relative to actuation of the cooking element. In some embodiments, communicating the control signal includes activating the residential HVAC system at a predetermined time after activation of the cooking element. In some embodiments, communicating the control signal includes activating the residential HVAC system at a predetermined time prior to activation of the cooking element.

In addition, in some embodiments, communicating the control signal includes activating the residential HVAC system at a predetermined time relative to a start of a delay start cooking operation. Further, in some embodiments, the cooking appliance further includes a sensor coupled to the controller, where the sensor includes a temperature sensor, a humidity sensor, an air quality sensor, an odor sensor or an electronic nose sensor, and communicating the control signal includes selectively actuating the residential HVAC system at least in part in response to the sensor.

Some embodiments may further include, with the controller, detecting an actuation state of the cooking element, and communicating the control signal to selectively actuate the residential HVAC system at least in part in response to the detected actuation state of the cooking element. In addition, in some embodiments the cooking appliance further includes a network interface coupled to the controller and configured to interface the controller with a home automation network to which the residential HVAC system is also interfaced, where communicating the control signal includes communicating the control signal over the home automation network to selectively actuate the residential HVAC system. In some embodiments, the network interface includes a wireless network interface.

The herein-described embodiments may also address other problems associated with the art by providing in another aspect a cooking appliance and method of controlling non-cooking device in which an operation of the non-cooking device is initiated in connection with cooking food with the cooking element. The non-cooking device may be any type of electronic device for which it may be desired to control relative to the cooking of food, e.g., to perform various non-limiting operations such as turning on an ice maker, turning up the heat on a water heater in anticipation of future dish washing, playing music or other audio, activating a pet door, a pet feeder, a garage door opener and/or lighting, among others.

Therefore, consistent with another aspect of the invention, a method of controlling a non-cooking device using a cooking appliance of the type including a housing, a cooking element disposed in the housing and configured to generate energy for cooking food, and a controller coupled to the cooking element, may include activating the cooking element to generate energy for cooking food, and with the controller, communicating a control signal to selectively control an operation of the non-cooking device in connection with cooking food with the cooking element.

In addition, in some embodiments, communicating the control signal to selectively control the operation of the non-cooking device in connection with cooking food with the cooking element times the operation relative to one or starting or completing cooking the food. Also, in some embodiments, the non-cooking device includes a refrigerator, and communicating the control signal to selectively control the operation of the non-cooking device in connection with cooking food with the cooking element includes controlling ice production by the refrigerator. Moreover, in some embodiments, the non-cooking device includes an ice maker, and communicating the control signal to selectively control the operation of the non-cooking device in connection with cooking food with the cooking element includes controlling ice production by the ice maker. Further, in some embodiments, the non-cooking device includes a water heater, and communicating the control signal to selectively control the operation of the non-cooking device in connection with cooking food with the cooking element includes controlling the water heater in anticipation of dish washing.

Also, in some embodiments, the non-cooking device includes an audio playback device, and communicating the control signal to selectively control the operation of the non-cooking device in connection with cooking food with the cooking element includes initiating playback of audio by the audio playback device. Further, in some embodiments, the non-cooking device includes a coffee maker, and communicating the control signal to selectively control the operation of the non-cooking device in connection with cooking food with the cooking element includes initiating a brewing operation by the coffee maker. In addition, in some embodiments, communicating the control signal to selectively control the operation of the non-cooking device in connection with cooking food with the cooking element includes controlling the non-cooking device to display a recipe. Further, in some embodiments, the non-cooking device includes a pet door, a pet feeder, a residential light or a garage door opener, and communicating the control signal to selectively control the operation of the non-cooking device in connection with cooking food with the cooking element includes controlling the pet door, pet feeder, residential light or garage door opener.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
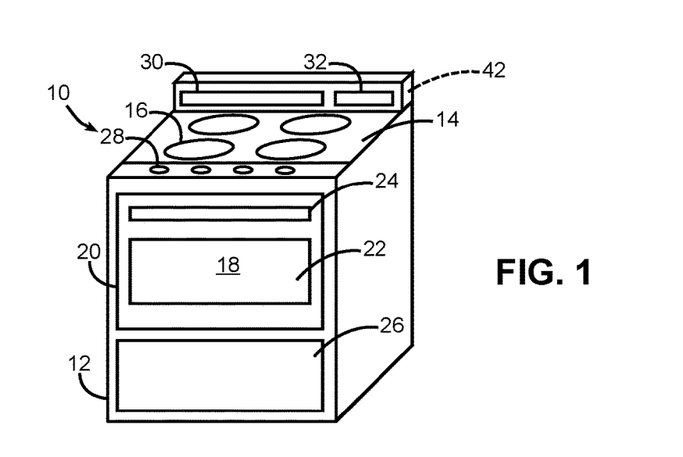
FIG. 1 is a perspective view of a cooking appliance consistent with some embodiments of the invention.

Turning now to the drawings, wherein like numbers denote like parts throughout the several views, FIG. 1 illustrates an example cooking appliance 10 in which the various technologies and techniques described herein may be implemented. Cooking appliance 10 is a residential-type range, and as such includes a housing 12, a cooktop 14 including a plurality of burners 16, and an oven 18 accessed via an oven door 20 having a window 22 and a handle 24.

Cooking appliance 10 may also include a storage drawer 26 in some embodiments, or in other embodiments, may include a second oven. Various cooking elements (not shown in FIG. 1) may also be incorporated into cooking appliance 10 for cooking food in oven 18, e.g., one or more electric or gas heating elements.

Cooking appliance 10 may also include various user interface devices, including, for example, control knobs 28 for controlling burners 16, a control panel 30 for controlling oven 18 and/or burners 16, and a display 32 for providing visual feedback as to the activation state of the cooking appliance. It will be appreciated that cooking appliance 10 may include various types of user controls in other embodiments, including various combinations of switches, buttons, knobs and/or sliders, typically disposed at the rear or front (or both) of the cooking appliance. Further, in some embodiments, one or more touch screens may be employed for interaction with a user. As such, in some embodiments, display 32 may be touch sensitive to receive user input in addition to displaying status information and/or otherwise interacting with a user. In still other embodiments, cooking appliance 10 may be controllable remotely, e.g., via a smartphone, tablet, or other networked computing device, e.g., using a web interface or a dedicated app.

Display 32 may also vary in different embodiments, and may include individual indicators, segmented alphanumeric displays, and/or dot matrix displays, and may be based on various types of display technologies, including LEDs, vacuum fluorescent displays, incandescent lights, etc. Further, in some embodiments audio feedback may be provided to a user via one or more speakers, and in some embodiments, user input may be received via a spoken or gesture-based interface.

As noted above, cooking appliance 10 of FIG. 1 is a range, which combines both a stovetop and one or more ovens, and which in some embodiments may be a standalone or drop-in type of range. In other embodiments, however, cooking appliance 10 may be another type of cooking appliance, e.g., a wall mount or freestanding oven, a drop-in stovetop, etc. In general, a cooking appliance consistent with the invention may be considered to include any residential-type appliance including a housing and one or more cooking elements disposed thereon and/or therein and configured to generate energy for cooking food.

In turn, a cooking element may be considered to include practically any type of energy-producing element used in residential applications in connection with cooking food, e.g., employing various cooking technologies such as electric, gas, light, microwaves, induction, convection, radiation, etc. In the case of an oven, for example, one or more cooking elements therein may be gas, electric, light, or microwave heating elements in some embodiments, while in the case of a stovetop, one or more cooking elements therein may be gas, electric, or inductive heating elements in some embodiments. Further, it will be appreciated that any number of cooking elements may be provided in a cooking appliance, and that multiple types of cooking elements may be combined in some embodiments, e.g., combinations of microwave and light cooking elements in some oven embodiments.

A cooking appliance consistent with the invention also generally includes one or more controllers configured to control the cooking elements and otherwise perform cooking operations at the direction of a user. In addition, as will become more apparent below, a controller of a cooking appliance in some embodiments may also be configured to communicate a control signal to selectively actuate a residential heating, ventilation and/or air conditioning (HVAC) system in connection with cooking food with the cooking element(s) controlled thereby.

Figure 2:
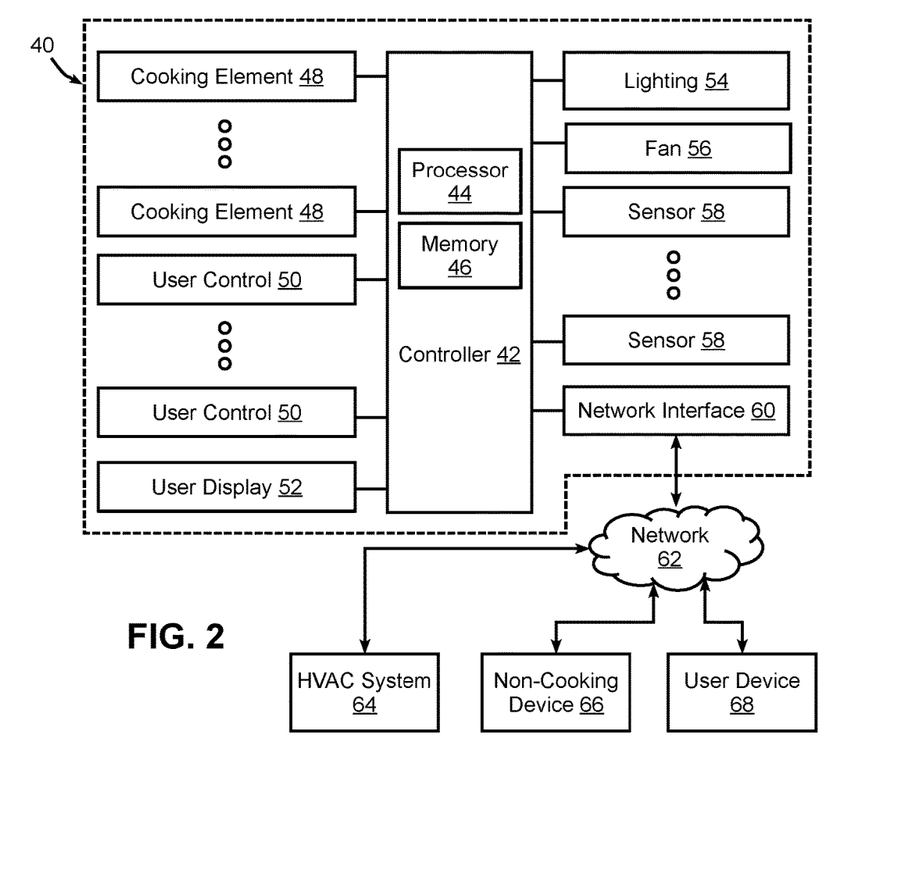
FIG. 2 is a block diagram of an example control system for a cooking appliance consistent with some embodiments of the invention.

FIG. 2, for example, illustrates an example embodiment of a cooking appliance 40 including a controller 42 that receives inputs from a number of components and drives a number of components in response thereto. Cooking appliance 40 may be implemented using practically any type of cooking appliance, e.g., a range, stovetop, single oven, double oven, wall oven, standalone oven, countertop oven, microwave oven, toaster oven, quick-cook oven, etc. Controller 42 may, for example, include one or more processors 44 and a memory 46 within which may be stored program code for execution by the one or more processors. The memory may be embedded in controller 42, but may also be considered to include volatile and/or non-volatile memories, cache memories, flash memories, programmable read-only memories, read-only memories, etc., as well as memory storage physically located elsewhere from controller 42, e.g., in a mass storage device or on a remote computer interfaced with controller 42.

As shown in FIG. 2, controller 42 may be interfaced with various components, including various cooking elements 48 used for cooking food (e.g., various combinations of gas, electric, inductive, light, microwave, light cooking elements, among others one or more user controls 50 for receiving user input (e.g., various combinations of switches, knobs, buttons, sliders, touchscreens, microphones, imaging devices, etc.), and a user display 52 (including various indicators, graphical displays, textual displays, speakers, etc.), as well as various additional components suitable for use in a cooking appliance, e.g., lighting 54 and/or one or more fans 56 (e.g., convection fans, cooling fans, etc.), among others.

Controller 42 may also be interfaced with various sensors 58 located to sense environmental conditions inside of and/or external to cooking appliance 40, e.g., one or more temperature sensors, humidity sensors, air quality sensors, smoke sensors, carbon monoxide sensors, odor sensors and/or electronic nose sensors, among others. While in some embodiments controller 42 may control a residential HVAC system based purely on the actuation state of a cooking element and/or a time relative thereto, in other embodiments the control of the residential HVAC system may additionally be based on the environmental conditions sensed by one or more sensors 58 such than a residential HVAC system is controlled responsive at least in part to the output of a sensor.

In some embodiments, controller 42 may also be coupled to one or more network interfaces 60, e.g., for interfacing with external devices via wired and/or wireless networks such as Ethernet, Wi-Fi, Bluetooth, NFC, cellular and other suitable networks, collectively represented in FIG. 2 at 62. Network 62 may incorporate in some embodiments a home automation network, which may be used to communicate control signals between cooking appliance 40 and various external devices, e.g., one or more HVAC systems 64 and/or one or more non-cooking devices 66. Furthermore, various communication protocols may be supported, including various types of home automation communication protocols.

A residential HVAC system 64, as noted above, may include various residential devices providing one or more HVAC functions, including, for example, heating, cooling, ventilation, purification, humidification, dehumidification, filtering, etc. A residential HVAC system may be a whole-house or central HVAC system, a zoned HVAC system and/or may be incorporated into one or more room HVAC systems (e.g., wall or window mounted air conditioners, fireplaces and/or heaters). As such, multiple HVAC systems and/or zones may be supported, and furthermore, control may be limited to otherwise dedicated to a particular HVAC system or zone. The aforementioned definition of a residential HVAC system, however, should not be considered to include a dedicated cooking-related ventilation system such as an exhaust fan or range hood.

HVAC system 64 does, however, include "smart" functionality in some embodiments to receive and process control signals supplied by cooking appliance 40. In other embodiments, however, a separate networkable component may be installed on or otherwise interfaced with a residential HVAC system to provide such functionality. Further, in some embodiments a thermostat associated with a residential HVAC system may incorporate the functionality for receiving and processing control signals supplied by cooking appliance 40, and as such, it will be appreciated that a thermostat may be considered to be a part of a residential HVAC system in some embodiments of the invention.

Cooking appliance 40 may also be in communication with other devices over network 62. For example, various non-cooking devices 66 may be coupled to network and controlled by cooking appliance 40 in some embodiments. Such non-cooking devices 66 may include but are not limited to a water heater, an audio and/or video playback device such as a television, set-top box, audio system, smart assistant device, video display, refrigerator, dishwasher, tablet, computer, smartphone, etc., a coffee maker, a pet door, a pet feeder, a residential light, a garage door opener, etc.

Further, in some embodiments, cooking appliance 40 may be interfaced with one or more user devices 68, e.g., computers, tablets, smart phones, wearable devices, etc., and through which cooking appliance 40 may be controlled and/or cooking appliance 40 may provide user feedback. A user device 68, for example, may be configured to establish profiles for various environmental conditions in order to trigger activation of a residential HVAC system in response to particular sensor inputs. Profiles, for example, may be established for one or more of time, temperature, humidity, optical profiles, grey-scales, cooking gases/molecules or any combination therein to optimize the room ambient conditions. In lieu of or in addition to profiles, a user device may be configured to adjust various settings on cooking appliance 40, as well as receive status information therefor.

In some embodiments, controller 42 may operate under the control of an operating system and may execute or otherwise rely upon various computer software applications, components, programs, objects, modules, data structures, etc. In addition, controller 42 may also incorporate hardware logic to implement some or all of the functionality disclosed herein. Further, in some embodiments, the sequences of operations performed by controller 42 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

Numerous variations and modifications to the cooking appliances illustrated in FIGS. 1-2 will be apparent to one of ordinary skill in the art, as will become apparent from the description below. Therefore, the invention is not limited to the specific implementations discussed herein.

Some embodiments consistent with the invention may be used to enable a cooking appliance to selectively actuate a residential HVAC system in connection with cooking food with one or more cooking elements of the cooking appliance. Actuation of a residential HVAC system, in this regard, may be considered to include various operations associated with the residential HVAC system, and may vary based upon the type of HVAC system. Actuation may include, for example, turning the residential HVAC system or a component thereof (e.g., a fan) on or off, changing a set point used by a control algorithm operated by the residential HVAC system, operating an air purification system (including filtration, germicidal, ionic, plasma, activated carbon, electrostatic or other purification technologies), operating a humidification system, operating a dehumidification system, operating a fan or ventilation system, operating an odor control system, or operating a scent management system, among others.

Moreover, actuation of the residential HVAC system may be based upon various operations that occur in connection with the cooking appliance. In some embodiments, for example, actuation of one or more cooking elements (which in some embodiments may be detected as various "actuation states" by the controller) may initiate control over a residential HVAC system, e.g., in response to turning a cooking element on or off, changing an energy output level of a cooking element (e.g., turning a cooking element "up" or "down"), starting or stopping a cooking operation that involves actuation of one or more cooking elements, transitioning between steps of a multi-step cooking operation involving actuation of one or more cooking elements, etc. Actuation of a cooking element is therefore not specifically limited to activating or deactivating the cooking element.

Actuation of a residential HVAC system in some embodiments may also be based on sensor input, and in some instances, based upon sensor input in combination with actuation of one or more cooking elements. Further, actuation of a residential HVAC system in some embodiments may also be based on temporal parameters, e.g., points in time and/or durations, and in some instances, in combination with actuation of one or more cooking elements.

As will become more apparent below, a residential HVAC system may be selectively actuated, for example, at a predetermined time relative to actuation of a cooking element, a predetermined time after activation of a cooking element, a predetermined time prior to activation of a cooking element, or a predetermined time relative to a start of a delay start cooking operation, among other instances. Furthermore, such actuation may be based at least in part in response to the detected actuation state of one or more cooking element. An actuation state may include a state such as "on" or "off" in some embodiments, while in other embodiments other actuation states may be defined, e.g., for different power levels ("low" or "high", wattage levels, percentages, etc., for different modes of operation, etc.

Figure 3:
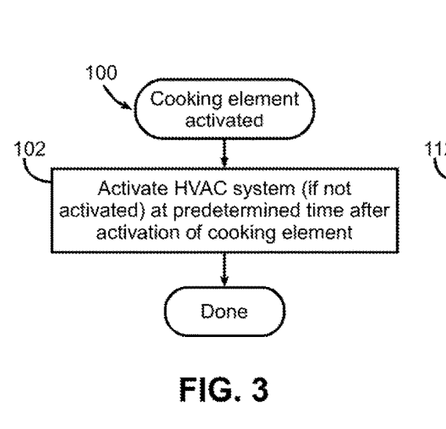
FIG. 3 is a flowchart illustrating an example sequence of operations for controlling a residential HVAC system based on activation of a cooking element using the cooking appliance of FIG. 2.

FIG. 3, for example, illustrates at 100 an example sequence of operations for controlling a residential HVAC system based on activation of a cooking element using cooking appliance 40 of FIG. 2. In this sequence of operations, whenever activation of a cooking element is detected, block 102 is executed to activate a residential HVAC system, if not already activated. As noted in block 102, this activation may be delayed by a predetermined amount in some embodiments, although no delay may be used in some embodiments. One illustrative example is turning on a central air conditioner in a home two minutes immediately once a user turns on an oven or a burner on a stovetop or range to ensure that the temperature in the kitchen does not start to rise.

Figure 4:
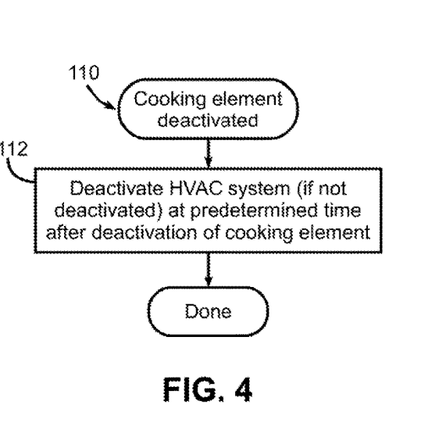
FIG. 4 is a flowchart illustrating an example sequence of operations for controlling a residential HVAC system based on deactivation of a cooking element using the cooking appliance of FIG. 2.

FIG. 4, in turn, illustrates at 110 a complementary sequence of operations for controlling a residential HVAC system based on deactivation of a cooking element using cooking appliance 40 of FIG. 2. In this sequence of operations, whenever deactivation of a cooking element is detected, block 112 is executed to deactivate a residential HVAC system, if not already deactivated. Similar to block 102, in block 112 this deactivation may be delayed by a predetermined amount in some embodiments, although no delay may be used in some embodiments. One illustrative example is turning off the central air conditioner turned on in the example above 30 minutes after the user turns the oven or the burner on the stovetop or range back off so the temperature in the kitchen is controlled until the cooking appliance has cooled.

Figure 5:
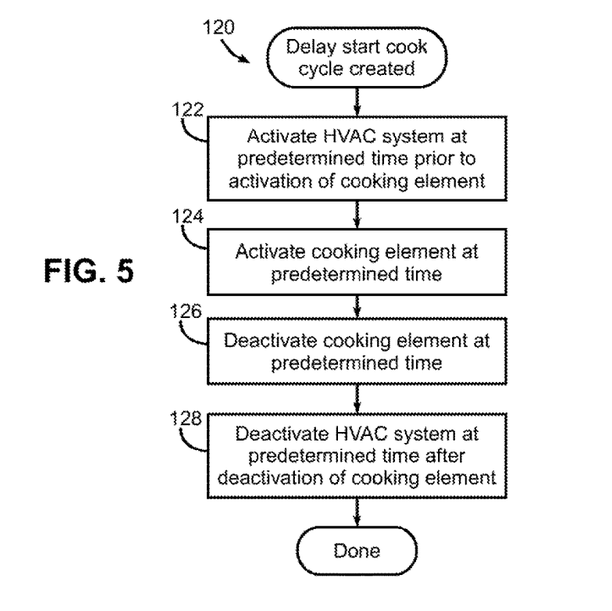
FIG. 5 is a flowchart illustrating an example sequence of operations for performing a delay start cook cycle using the cooking appliance of FIG. 2.

FIG. 5 illustrates at 120 another sequence of operations 120 for performing a delay start cook cycle using cooking appliance 40 of FIG. 2. In this sequence of operations, a user has created a delay start cook cycle, i.e., a request to turn on an oven or stovetop burner at a predetermined time in the future, and optionally, a duration or end time at which to turn the oven or stovetop burner back off. This sequence of operations exemplifies that actuation of an HVAC may be predictive in nature and may occur prior to actuation of a cooking element in some instances. Thus, in block 122, a residential HVAC system is activated at a predetermined time prior to activation of a cooking element, and then in block 124 the cooking element is activated at the predetermined time established for the delay start cook cycle. Then, in block 126, the cooking element is deactivated at the predetermined time, or optionally, manually by a user once cooking is complete, and block 128 thereafter deactivates the residential HVAC system at a predetermined time after deactivation of the cooking element. One illustrative example is setting a delay start cook cycle for an oven to turn on in three hours or at 3:00 pm. 15 minutes prior to the start time for the cook cycle, a central air conditioner may be turned on in anticipation of the increased heat put out by the oven. Then, once the oven is turned off, the central air conditioner may be turned back off 15 minutes later to allow for the oven to cool.

Figure 6:
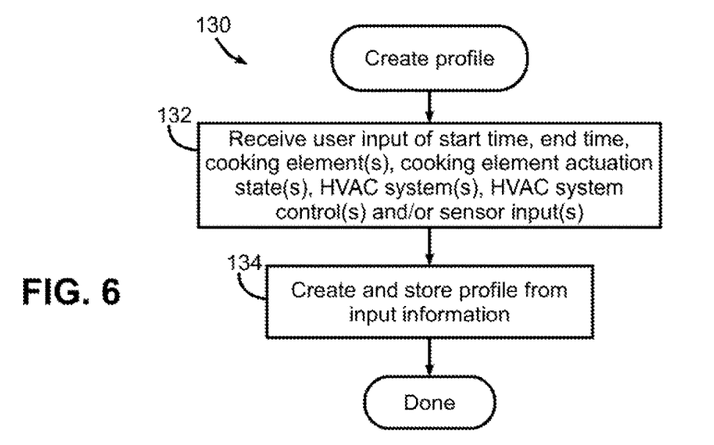
FIG. 6 is a flowchart illustrating an example sequence of operations for creating a profile for controlling a residential HVAC system using the cooking appliance of FIG. 2.

In some embodiments, more complex operations may be supported, e.g., to support different cooking element actuation states, sensor states, etc. In some embodiments, for example, "profiles" or rules may be configured in a cooking appliance to configure the controller therefor to actuate a residential HVAC system in desired circumstances. FIG. 6, as one example, is a flowchart illustrating an example sequence of operations 130 for creating a profile for controlling a residential HVAC system using the cooking appliance of FIG. 2. In block 132, various user input is received for creating a profile. The user input may be received via the controls of the cooking appliance, e.g., via a touchscreen, or alternatively may be received via a remote device such as a mobile device, computer or the like. The user input may include various profile settings including but not limited to start and/or end times, cooking elements, cooking element actuation states, residential HVAC systems, HVAC system controls, and sensor inputs, and once this information is received, block 134 creates a profile and stores it with the controller. In some embodiments, various profile settings may also be provided as default values or otherwise determined by the controller.

Start and end times refer to either points in time or durations associated with actuating a residential HVAC system and/or a component thereof. These times may be relative to a change in actuation state of a cooking element, a cooking operation or step thereof, etc.

A profile may specify one or more cooking elements and one or more cooking element actuation states (e.g., when broiler cooking element turned on, when stovetop burner is set to medium high, when oven cooking element is set to 300 degrees or more, etc.). Furthermore, a profile may specify one or more residential HVAC systems and one or more HVAC system controls therefor (e.g., turn on central air conditioner, turn on humidifier of central HVAC system, turn off central heater, turn on zone 1 of central HVAC system, lower room air conditioner set point 3 degrees, set thermostat to 68 degrees, etc.)

A profile may also define one or more sensor inputs that may be used in lieu of or in addition to the actuation state of one or more cooking elements, e.g., when smoke is detected, when an odor is detected, when ambient temperature near the cooking appliance is greater than 72 degrees, etc.).

It will be appreciated that the various inputs used to build a profile may specify one or more conditions combined with one or more operations to perform in response to those conditions. The conditions may be based on binary rules, based on ranges, based on setpoints, or in other manners that will be apparent to those of ordinary skill in the art. Furthermore, the operations will generally include communicating control signals to initiate one or more operations on one or more residential HVAC systems. The various inputs, conditions, and operations that may be implemented using the aforementioned profiles are innumerable, and therefore the invention is not limited to the specific instances mentioned herein.

Figure 7:
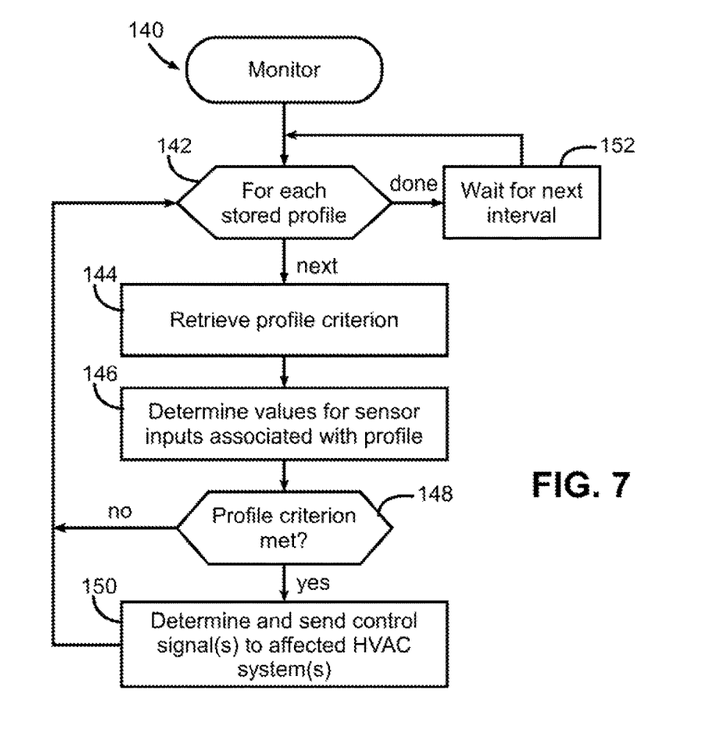
FIG. 7 is a flowchart illustrating an example sequence of operations for monitoring the profiles created in the sequence of operations of FIG. 6.

Now turning to FIG. 7, this figure illustrates at 140 an example sequence of operations for monitoring the profiles created in sequence of operations 130 of FIG. 6. Sequence 140 is configured to periodically monitor the operation of a cooking appliance and perform operations in response to the conditions of any stored profiles being met. Accordingly, block 142 initiates a FOR loop to process each stored profile for the cooking appliance. For each such profile, block 144 retrieves the profile criterion, i.e., the condition(s) specified by the profile, and block 146 determines values for any sensor inputs that are associated with the profile. If no sensor inputs are defined in the criterion, block 146 need not determine any such values. Block 148 then determines if the profile criterion is met, and if not, returns control to block 142 to process additional stored profiles. If, however, the profile criterion is met, control passes from block 148 to block 150 to determine and send one or more control signals to any affected residential HVAC system specified by the profile, thereby actuating the residential HVAC system(s) responsive to the profile criterion being met. Control then returns to block 142 to process additional stored profiles, and once all stored profiles are processed, block 142 passes control to block 152 to wait for the next monitoring interval, at which time control returns to block 142 to reprocess each stored profile for the current monitoring interval.

Figure 8:
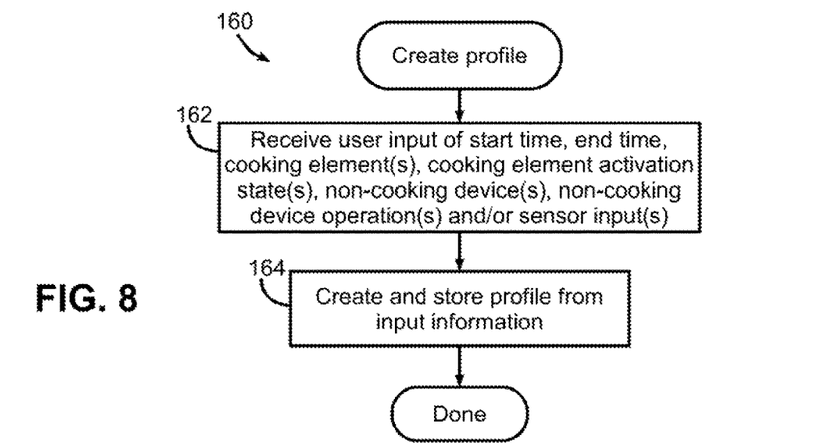
FIG. 8 is a flowchart illustrating an example sequence of operations for creating a profile for controlling a non-cooking device using the cooking appliance of FIG. 2.
Figure 9:
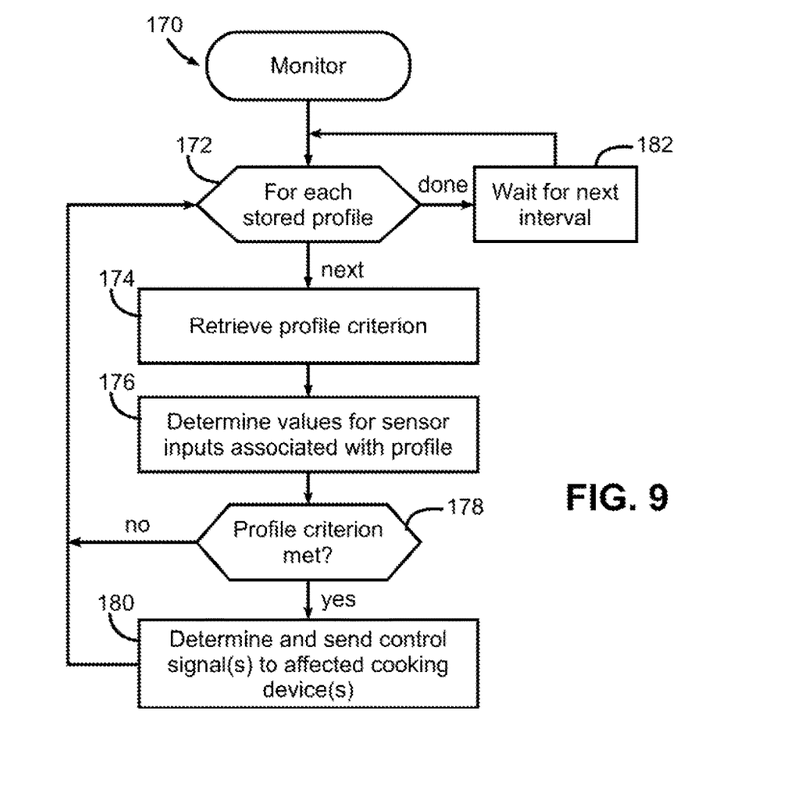
FIG. 9 is a flowchart illustrating an example sequence of operations for monitoring the profiles created in the sequence of operations of FIG. 8.

Now turning to FIGS. 8 and 9, as noted above a cooking appliance may be configured to control non-cooking devices in addition to or in lieu of residential HVAC systems in some embodiments. FIG. 8, for example, is a flowchart illustrating an example sequence of operations 160 for creating a profile for controlling a non-cooking device using the cooking appliance of FIG. 2. In block 162, various user input is received for creating a profile. The user input may be received via the controls of the cooking appliance, e.g., via a touchscreen, or alternatively may be received via a remote device such as a mobile device, computer or the like. The user input may include various profile settings including but not limited to start and/or end times, cooking elements, cooking element actuation states, non-cooking devices, non-cooking device operations, and sensor inputs, and once this information is received, block 164 creates a profile and stores it with the controller. In some embodiments, various profile settings may also be provided as default values or otherwise determined by the controller.

Start and end times, cooking element(s), cooking element actuation state(s) and sensor input(s) may be similar to the inputs discussed above in connection with block 132 of FIG. 6. Non-cooking devices refers to which networked non-cooking devices should be actuated in response to a criterion for a profile being met, while non-cooking device operations refer to operations that may be performed by such devices when a criterion is met. Given the wide variety of non-cooking devices that may be controlled in this manner, the types of operations capable of being performed by those devices are practically innumerable.

Now turning to FIG. 9, this figure illustrates at 170 an example sequence of operations for monitoring the profiles created in sequence of operations 160 of FIG. 8. Sequence 170 is configured to periodically monitor the operation of a cooking appliance and perform operations in response to the conditions of any stored profiles being met. Accordingly, block 172 initiates a FOR loop to process each stored profile for the cooking appliance. For each such profile, block 174 retrieves the profile criterion, i.e., the condition(s) specified by the profile, and block 176 determines values for any sensor inputs that are associated with the profile. If no sensor inputs are defined in the criterion, block 17 need not determine any such values. Block 178 then determines if the profile criterion is met, and if not, returns control to block 172 to process additional stored profiles. If, however, the profile criterion is met, control passes from block 178 to block 180 to determine and send one or more control signals to any affected non-cooking devices specified by the profile, thereby actuating the non-cooking devices(s) responsive to the profile criterion being met. Control then returns to block 172 to process additional stored profiles, and once all stored profiles are processed, block 172 passes control to block 182 to wait for the next monitoring interval, at which time control returns to block 172 to reprocess each stored profile for the current monitoring interval.

The framework supported by FIGS. 8 and 9 may be utilized to perform a wide variety of operations responsive to activation or actuation of a cooking element of a cooking appliance. For example, an operation of a non-cooking device may be timed relative to starting or completing cooking food, and may perform various operations that may be desired relative to cooking food. For example, it may be desirable in some circumstances to control ice production by a refrigerator or stand-alone ice maker, e.g., to turn up the ice maker in anticipation of dinner and turn back down some time later such as after cooking is complete.

In some circumstances, it may be desirable to actuate a water heater in anticipation of a need for additional hot water, e.g., to turn up the water heater in anticipation of hand dish washing or running the dishwasher, and turn down once cooking is complete. In other circumstances, it may desirable to control an audio playback device such as a whole house audio system, a bookshelf audio system, a smart assistant device, etc., e.g., to play music, news, podcasts, radio programs, etc. during cooking and/or turn down when cooking is complete. In still other circumstances, it may be desirable to control a coffee maker to initiate a brewing operation by the coffee maker in connection with cooking food. In other circumstances, it may be desirable to control a non-cooking device such as a smart phone, tablet, laptop, refrigerator screen, or other video display device to display a recipe or other relevant information in connection with cooking food.

In still other circumstances, various types of smart home devices may be controlled, e.g., to unlock a smart pet door to let a pet outside, automatically fill a smart pet feeder, turn on lights within a residence, or open a garage door by controlling a garage door opener. It will be appreciated that these examples are not exclusive, and thus additional applications of the herein-described techniques may be envisioned beyond those presented herein.

It will be appreciated that various modifications may be made to the embodiments discussed herein, and that a number of the concepts disclosed herein may be used in combination with one another or may be used separately. Therefore, the invention lies in the claims hereinafter appended.

What is claimed is:

1. A cooking appliance, comprising:
a housing;
a cooking element disposed in the housing and configured to generate energy for cooking food; and
a controller disposed in the housing, coupled to the cooking element and configured to communicate a first control signal to selectively actuate a residential heating, ventilation and/or air conditioning (HVAC) system in connection with cooking food with the cooking element, wherein the controller is configured to communicate the first control signal to activate the residential HVAC system at a predetermined time prior to activation of the cooking element, and wherein the controller is further configured to detect an actuation state of the cooking element and communicate a second control signal to selectively actuate the residential HVAC system at least in part in response to the detected actuation state of the cooking element.

2. The cooking appliance of claim 1, wherein the cooking appliance includes an oven, and wherein the cooking element comprises a gas, electric, light, or microwave heating element.

3. The cooking appliance of claim 1, wherein the cooking appliance includes a stovetop, and wherein the cooking element comprises a gas, electric, or inductive heating element.

4. The cooking appliance of claim 1, wherein the cooking appliance comprises a range, and wherein the cooking element comprises a gas, electric, light, or inductive heating element.

5. The cooking appliance of claim 1, wherein the controller is configured to communicate a third control signal to selectively actuate the residential HVAC system at a predetermined time relative to actuation of the cooking element.

6. The cooking appliance of claim 5, wherein the controller is configured to communicate the third control signal to activate the residential HVAC system at a predetermined time after activation of the cooking element.

7. The cooking appliance of claim 1, wherein the controller is configured to communicate the first control signal to activate the residential HVAC system at a predetermined time relative to a start of a delay start cooking operation.

8. The cooking appliance of claim 1, further comprising a sensor coupled to the controller, wherein the controller is configured to communicate a third control signal to selectively actuate the residential HVAC system at least in part in response to the sensor.

9. The cooking appliance of claim 8, wherein the sensor includes a temperature sensor, a humidity sensor, an air quality sensor, an odor sensor or an electronic nose sensor.

10. The cooking appliance of claim 1, further including a network interface coupled to the controller and configured to interface the controller with a home automation network to which the residential HVAC system is also interfaced, wherein the controller communicates the first control signal to communicate the control signal to selectively actuate the residential HVAC system over the home automation network.

11. The cooking appliance of claim 10, wherein the network interface comprises a wireless network interface, and wherein the residential HVAC system comprises a central or room HVAC system.

12. The cooking appliance of claim 1, wherein the residential HVAC system comprises a zoned HVAC system, and wherein the controller is configured to communicate a third control signal to selectively actuate a first zone among a plurality of zones of the zoned HVAC system.

13. A method of controlling a residential heating, ventilation and/or air conditioning (HVAC) system using a cooking appliance of the type including a housing, a cooking element disposed in the housing and configured to generate energy for cooking food, and a controller disposed in the housing and coupled to the cooking element, the method comprising:
   activating the cooking element to generate energy for cooking food;
   with the controller, communicating a first control signal to selectively actuate a residential HVAC system in connection with cooking food with the cooking element, wherein communicating the first control signal includes activating the residential HVAC system at a predetermined time prior to activation of the cooking element;
   detecting an actuation state of the cooking element; and
   communicating a second control signal to selectively actuate the residential HVAC system at least in part in response to the detected actuation state of the cooking element.

14. The method of claim 13, wherein the cooking appliance includes an oven, a stovetop or a range, and wherein the cooking element comprises a gas, electric, light, microwave or inductive heating element.

15. The method of claim 13, further comprising communicating a third control signal to selectively actuate the residential HVAC system at a predetermined time relative to actuation of the cooking element.

16. The method of claim 15, wherein communicating the third control signal includes activating the residential HVAC system at a predetermined time after activation of the cooking element.

17. The method of claim 13, wherein communicating the first control signal includes activating the residential HVAC system at a predetermined time relative to a start of a delay start cooking operation.

18. The method of claim 13, wherein the cooking appliance further includes a sensor coupled to the controller, wherein the sensor includes a temperature sensor, a humidity sensor, an air quality sensor, an odor sensor or an electronic nose sensor, and wherein the method further comprises communicating a third control signal to selectively actuate the residential HVAC system at least in part in response to the sensor.

19. The method of claim 13, wherein the cooking appliance further includes a network interface coupled to the controller and configured to interface the controller with a home automation network to which the residential HVAC system is also interfaced, wherein communicating the first control signal includes communicating the control signal over the home automation network to selectively actuate the residential HVAC system.

20. The method of claim 19, wherein the network interface comprises a wireless network interface.

21. A method of controlling a non-cooking device using a cooking appliance of the type including a housing, a cooking element disposed in the housing and configured to generate energy for cooking food, and a controller disposed in the housing and coupled to the cooking element, the method comprising:
   activating the cooking element to generate energy for cooking food;
   with the controller, communicating a first control signal at a predetermined time prior to activation of the cooking element to selectively control an operation of the non-cooking device in connection with cooking food with the cooking element;
   detecting an actuation state of the cooking element; and
   communicating a second control signal to selectively control the operation of the non-cooking device at least in part in response to the detected actuation state of the cooking element.

22. The method of claim 21, wherein communicating the first control signal to selectively control the operation of the non-cooking device in connection with cooking food with the cooking element times the operation relative to one or starting or completing cooking the food.

23. The method of claim 21, wherein the non-cooking device comprises a refrigerator, and wherein communicating the first control signal to selectively control the operation of the non-cooking device in connection with cooking food with the cooking element includes controlling ice production by the refrigerator.

24. The method of claim 21, wherein the non-cooking device comprises an ice maker, and wherein communicating the first control signal to selectively control the operation of the non-cooking device in connection with cooking food with the cooking element includes controlling ice production by the ice maker.

25. The method of claim 21, wherein the non-cooking device comprises a water heater, and wherein communicating the first control signal to selectively control the operation of the non-cooking device in connection with cooking food with the cooking element includes controlling the water heater in anticipation of dish washing.

26. The method of claim 21, wherein the non-cooking device comprises an audio playback device, and wherein communicating the first control signal to selectively control the operation of the non-cooking device in connection with cooking food with the cooking element includes initiating playback of audio by the audio playback device.

27. The method of claim 21, wherein the non-cooking device comprises a coffee maker, and wherein communicating the first control signal to selectively control the operation of the non-cooking device in connection with cooking food with the cooking element includes initiating a brewing operation by the coffee maker.

28. The method of claim 21, wherein communicating the first control signal to selectively control the operation of the non-cooking device in connection with cooking food with the cooking element includes controlling the non-cooking device to display a recipe.

29. The method of claim 21, wherein the non-cooking device comprises a pet door, a pet feeder, a residential light or a garage door opener, and wherein communicating the first control signal to selectively control the operation of the non-cooking device in connection with cooking food with the cooking element includes controlling the pet door, pet feeder, residential light or garage door opener.

\* \* \* \* \*